United States Patent Office 2,731,810
Patented Jan. 24, 1956

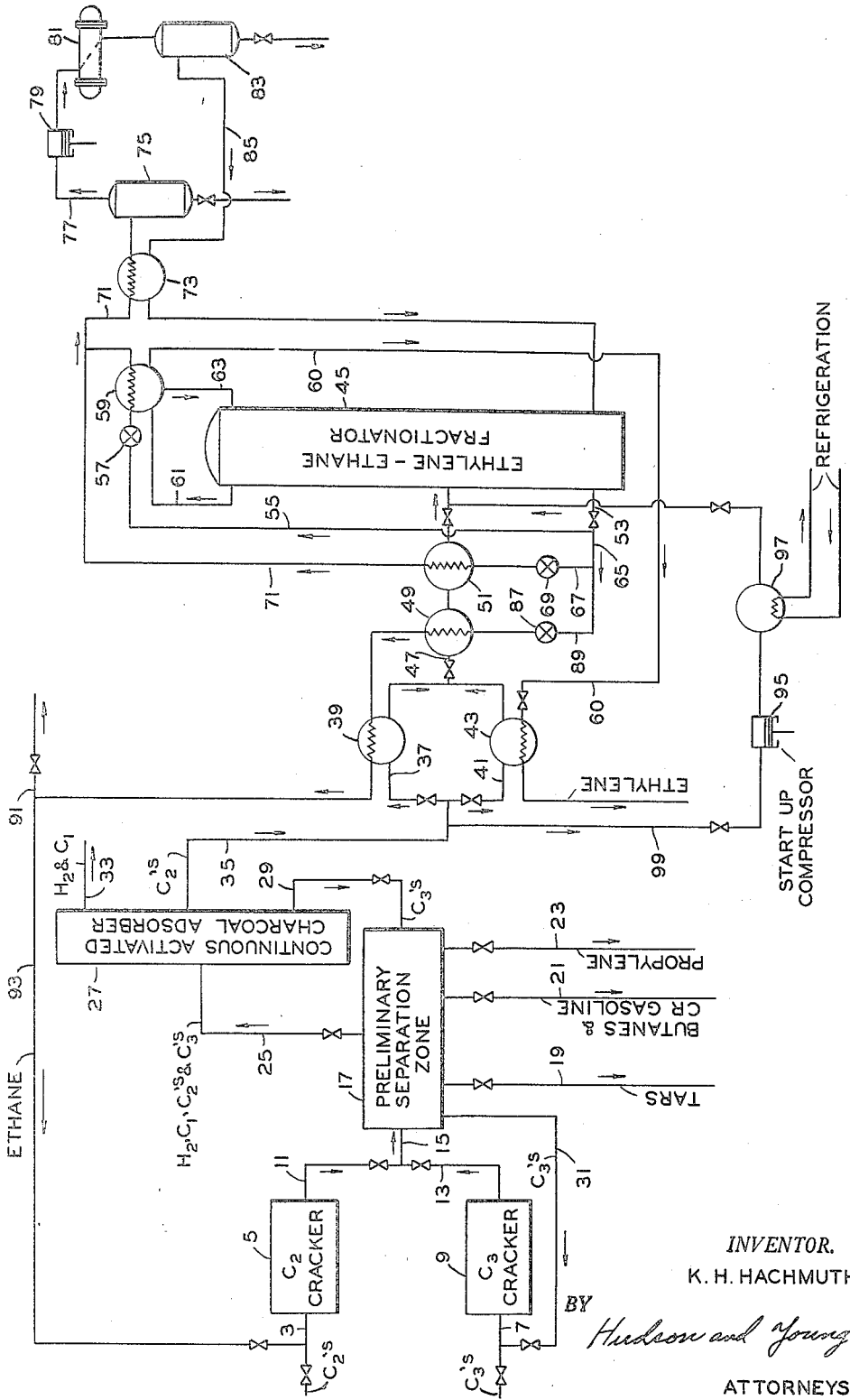

1

2,731,810

FRACTIONAL DISTILLATION METHOD AND APPARATUS

Karl H. Hachmuth, Bartlesville, Okla., assignor to Phillips Petroleum Company, a corporation of Delaware Original application January 4, 1949, Serial No. 69,147, now Patent No. 2,600,110, dated June 10, 1952. Divided and this application January 2, 1952, Serial No. 264,450

13 Claims. (Cl. 62—122)

This invention relates to the separation of vaporizable materials. In one of its more specific aspects it relates to the separation of vaporizable materials by fractional distillation. In still another of its more specific aspects it relates to the separation of multi-component mixtures of low-boiling normally gaseous materials by a low-temperature fractional distillation process using one of the products of the separation as the refrigerant. In still another of its more specific aspects it relates to apparatus for fractional distillation of vaporizable materials. In still another of its more specific aspects it relates to fractional distillation separation apparatus wherein one of the products is used as an internal refrigerant.

This application is a division of my copending application Serial No. 69,147, filed January 4, 1949, for Fractional Distillation Method, now Patent Number 2,600,110, granted June 10, 1952.

In the separation of vaporizable materials by fractional distillation in a fractionator, it is necessary to remove heat from the overhead vapors and to add heat to the kettle in order to provide liquid reflux in the enriching section and vapors in the stripping section of the fractionator. The most common method of removing heat from the overhead vapor so as to at least partially condense the vapor and provide liquid reflux is to transfer heat from the vapor to a cooling medium by indirect heat-exchange. Water is the most common heat-exchange material used to take up heat so as to condense or partially condense the overhead vapors. Stripping vapors in the stripping section of the fractionator are most commonly provided by equipping the fractionator with a reboiler or reboiling coil and using steam or other outside sources of heat to reboil the fractionator.

Up until recently heat energy from steam was a great deal cheaper than energy supplied electrically. But at present the increased cost of fuel, such as coal or fuel gas, has made the cost of heat energy from steam more nearly approximate the cost of electrical energy, since fuel costs have a greater effect on the cost of steam than in the case of electrical energy. I have invented a process for separating a multi-component mixture of vaporizable material which takes advantage of this economic factor, that is, I have invented a fractional distillation process which utilizes the heat removed from the overhead vapors to reboil or add heat to the kettle of the fractionator. I remove the heat from the overhead vapors and transfer it to the kettle of the fractionator by mechanical means, that is, a heat-pump system operated mechanically and supplied energy electrically. In difficult separations where the boiling points of the components to be separated are relatively close together, I find that the process of my invention usually has the advantage economically over the ordinary process where heat energy is supplied by steam, when the cost of energy supplied electrically is no more than about four times the cost of the equivalent amount of heat energy supplied by steam.

2

Another important feature of the improved fractionation process of my invention is that less equipment is required than in carrying out fractionation by the usual methods. The process of my invention eliminates the reboiler, since I use one of the products of the separation as a heat transfer medium to carry heat from the overhead vapors to the kettle portion of my fractionation zone. In so operating, a portion of one of the products of the separation is removed directly from and reintroduced directly into the fractionator. That is, a portion of the kettle product is used as the heat transfer medium being reintroduced into the kettle portion of the fractionator.

The process of my invention is particularly adaptable to separations such as the separation and recovery of ethylene from a mixture of ethylene and ethane by fractional distillation. In separations such as this, fractionation temperatures must necessarily be below ordinary atmospheric temperatures since the critical temperature of one of the components is below ordinary atmospheric temperatures. Where relatively pure products are being produced in a refrigerated separation process and where these products are of such nature that they can be used as refrigerants, I find that refrigeration work can be reduced by using one of the products as an internal-refrigerant. When I use the term "internal-refrigerant" I mean a refrigerant which is introduced directly into a process stream at some suitable point and thus becomes part of the process stream. An external-refrigerant moves around the refrigeration cycle and does not directly enter a process stream.

By at least one of the aspects of this invention, one or more of the following objects will be obtained.

An object of this invention is to provide an improved fractionation method for separating a multi-component mixture of vaporizable materials.

Another object of this invention is to provide an improved fractional distillation method for separating a multi-component mixture of low-boiling normally gaseous materials into a low-boiling fraction and a high-boiling fraction.

Still another object of this invention is to provide a method of transferring heat from the overhead vapors to the bottom portion of a fractionator to reboil the fractionator.

Still another object of this invention is to provide an internal-refrigerant low-temperature fractional distillation method for separating and recovering ethylene from a mixture of ethylene and ethane.

Still another object of this invention is to provide improved apparatus for separating a multi-component mixture of vaporizable materials.

Still another object of this invention is to provide improved fractional distillation apparatus for separating a multi-component mixture of low-boiling normally gaseous materials into a low-boiling fraction and a high-boiling fraction.

Other objects and advantages of my invention will become apparent, to one skilled in the art, from this disclosure.

The fractional distillation process of my invention may be applied to the separation of vaporizable materials but is preferably applied to difficult separations wherein the temperature differential between the top and the bottom of the fractionator is not very great. The process is preferably applied to the separation of a multi-component mixture of low-boiling normally gaseous materials into a low-boiling fraction and a high-boiling fraction such as the separation of ethylene and ethane, butadiene and butene-2, propane and propylene, or the separation of nitrogen from methane. The process of my invention is not limited to low-temperature fractionation wherein refrigeration is necessary. It may be applied to the separation of vaporizable materials such as $C_5$ to $C_8$ hydrocarbons or even higher boiling materials, especially difficult separations where the temperature differential over the fractionator is relatively small. Of course, refrigeration for the separation of these materials is not necessary, and when using the process of my invention for the separation of these materials I prefer to refer to my process as a heat-pump system, that is, heat is pumped from the overhead vapors to the kettle of the fractionator. In carrying out my process, it is not desirable to use a product material as internal-refrigerant which polymerizes upon the application of pressure or which corrodes equipment or which is highly explosive in nature since the material or product used as the internal-refrigerant or heat transfer medium is compressed in suitable equipment.

A drawing accompanies and is a part of this disclosure. The figure is a diagrammatic flow sheet showing an integrated process wherein $C_2$ and $C_3$ hydrocarbons are thermally cracked separately. The ethane and the ethylene in the effluent from the two cracking operations are separated from the other products in the effluent and are ultimately isolated using a continuous activated charcoal adsorber. The ethane and ethylene stream is then fed to a low-temperature fractionator and the ethylene is separated and recovered using the process of my invention. In the ethylene-ethane separation step ethane is used as the internal-refrigerant.

With reference to the figure, I will now discuss the application of the process of my invention to the separation and recovery of ethylene from a stream containing ethylene and ethane, a preferred specfic embodiment by my invention. The quantities, temperatures, pressures, purities, reflux ratios, etc. referred to in the following discussion are not to unduly limit the scope of my invention. The preparation of the ethylene-ethane stream separated by the novel fractional distillation process of my invention is set forth in detail and discussed at greater length in the application of Walter A. Goldtrap, Serial No. 82,932, filed March 23, 1949, now abandoned. A $C_2$ stream comprised predominantly of ethane is fed through line 3 into $C_2$ cracker 5 and a $C_3$ stream comprised predominantly of propane is fed through line 7 into $C_3$ cracker 9. The $C_2$ and $C_3$ crackers are preferably pebble heater apparatus, thermally cracking the $C_2$'s and $C_3$'s. The effluent from $C_2$ cracker 5 is withdrawn through line 11 and is combined with the effluent of $C_3$ cracker 9 which is withdrawn through line 13. The combined effluents are passed through line 15 into a preliminary separation zone 17. Tars, butanes and cracked gasolines and propylene are separated from the effluent and are withdrawn from the preliminary separation zone through lines 19, 21 and 23 respectively. A stream comprised predominantly of $H_2$, $C_1$, $C_2$'s and $C_3$'s is separated from the cracker effluents, withdrawn from the preliminary separation zone 17 through line 25 and passed to a continuous activated charcoal adsorber 27. A bottoms stream comprised predominantly of $C_3$'s is withdrawn from adsorber 27 and passed back to preliminary separation zone 17 through line 29. The propane is ultimately separated from this stream in separation zone 17 and recycled through line 31 to line 7 and thence into $C_3$ cracker 9. The $H_2$, $C_1$ and lighter in the feed to continuous activated charcoal adsorber 27 is taken overhead from the adsorber through line 33. This stream is usually used or sold as fuel. A side stream containing ethylene and ethane is withdrawn from adsorber 27 and passed through line 35 to a cooling zone to prepare the $C_2$ stream for final separation. The $C_2$ stream passed through line 35 is split into two portions, one portion being passed through line 37 and indirect heat-exchanger 39. The other portion is passed through line 41 and indirect heat-exchanger 43. The portion of the feed passed through heat-exchanger 39 is cooled by indirect heat-exchange with a portion of the kettle product from ethylene-ethane fractionator 45 as will hereinafter be set forth. The portion of the $C_2$ feed stream passed through heat-exchanger 43 is cooled by indirect heat-exchange with the overhead ethylene product stream from fractionator 45 as will hereinafter be set forth. The two portions of the $C_2$ feed stream are combined and passed by line 47 through heat-exchangers 49 and 51 wherein the feed stream is further cooled by indirect heat-exchange with the kettle product from fractionator 45. I prefer this manner of cooling the $C_2$ feed stream prior to its introduction into fractionator 45; however, I do not want to be unduly limited by the heat-exchange scheme set forth since other heat-exchange methods to precool the feed with the overhead and bottoms of the fractionator would work. A portion of the liquid kettle product is withdrawn through lines 53 and 55 and passed through an expansion zone 57 wherein it is expanded and cooled. The expanded and cooled stream is then passed through heat-exchanger 59 which is the overhead condenser for fractionator 45. Overhead vapors from fractionator 45 are passed into overhead condenser 59 through line 61 where they are partially condensed by indirect heat-exchange with the cooled effluent vapors and liquid from expansion zone 57. Condensed overhead vapors are withdrawn from overhead condenser 59 and passed back to fractionator 45 through line 63 and are used as liquid reflux. A portion of the liquid kettle product from fractionator 45 is withdrawn through lines 53, 65 and 67 and passed through expansion zone 69 wherein the liquid stream is expanded and cooled. The expanded vapor and liquid from expansion zone 69 is passed to indirect heat-exchanger 51 where they cool the feed to fractionator 45. The expanded streams leaving exchanger 51 and overhead condenser 59 are combined and passed through line 71 into heat-exchanger 73 wherein they are heated by indirect heat-exchange as hereinafter set forth. The vapors which may contain a small amount of impurities or liquid are then passed to separator or receiver 75 before compressor 79. Vapors are withdrawn from a separator or receiver 75 through line 77 and are compressed in compressor 79 and the compressed vapors are cooled in cooler 81. The compressed vapors are preferably cooled in cooler 81 by indirect heat-exchange with cooling water, but of course, any cooling medium may be used. The cooled, compressed vapors are then passed to separator or receiver 83 wherein impurities, liquid and/or polymers are separated. The compressed and cooled vapor in receiver 83 is withdrawn through line 85 and further cooled, preferably to a point where condensation is imminent, that is, to a point at or near its dew point, in heat-exchanger 73. The compressed and cooled vapor which is at or near its dew point, having a higher heat content than the corresponding amount of liquid kettle product used in the refrigeration cycle, is then passed directly into the kettle portion of fractionator 45 wherein the compressed and cooled vapors preferably directly contact the kettle product. The vapor condenses in the kettle and stripping section giving up the heat necessary to reboil fractionator 45. The vapor passes into the kettle product furnishing stripping section vapor in fractionator 45, some heat exchange taking place with the stripping section liquid which passes to the kettle portion of fractionator 45. A portion of liquid kettle product from fractionator 45 is passed into expansion zone 87 through lines 53, 65 and 89 wherein it is expanded and cooled. The effluent from expansion zone 87 is then passed through heat-exchangers 49 and 39 to cool the feed to fractionator 45 as hereinbefore set forth. The heated stream leaving indirect exchanger 39 is then the ethane make product produced by fractionator 45. It may be withdrawn from the system through line 91 or passed through lines 93 and 3 back into $C_2$ cracker 5 for further conversion. Predominantly ethylene overhead vapors are withdrawn from overhead condenser 59 and are passed by line 60 through indirect heat-exchanger 43 wherein they cool the portion of the feed stream passed through exchanger 43 by line 41. The heated ethylene vapor stream leaving exchanger 43 is then the overhead make product produced by fractionator 45. A start-up system is shown on the diagrammatic flow sheet which comprises start-up compressor 95 and cooler 97. The $C_2$ feed stream in line 35 is passed by line 99 to compressor 95 wherein it is compressed, to cooler 97 wherein the compressed feed stream is cooled and at least partially liquefied, and thence into fractionator 45. A refrigeration system (not shown) is provided to cool and at least partially liquefy the start-up feed stream in cooler or cooling zone 97.

In carrying out the process of my invention using ethane kettle product as the internal-refrigerant, I prefer that the ethane-ethylene stream fed to fractionator 45 contain at least 20 per cent ethylene. I prefer to operate fractionator 45 under a pressure of from 50 to 250 pounds per square inch absolute and under a liquid reflux to overhead product ratio of from 5:1 to 11:1. I find that it is advisable in operating the fractional distillation process of my invention to have no more than 12 per cent ethylene in the kettle product when the kettle product is being used as the internal-refrigerant. I find that it is still better to have no more than 8 per cent ethylene in the kettle product when the kettle product is being used as the internal-refrigerant. The fractional distillation process of my invention is preferably operated with a minimum ΔT on the low temperature heat-exchangers of from 5 to 10° F.

Following is an example of my invention. The quantities, temperatures, pressures, purities, reflux ratios etc. are not to be deemed to unduly limit the scope of my invention. An ethane-ethylene stream having the following composition and at a temperature of 100° F. and under a pressure of 142 pounds per square inch gauge is passed to the feed cooling zone via line 35 at a rate of 3681 mols/S. D.

Feed:

| | Mols/S. D. |
|---|---|
| Methane | 5 |
| Ethylene | 3027 |
| Ethane | 639 |
| Propylene | 5 |
| Propane | 5 |
| Total | 3681 |

By indirect heat-exchange with the expanded kettle product from fractionator 45 and the overhead make product from fractionator 45, the feed stream is cooled to —47° F. and is introduced into fractionator 45. Fractionator 45 operates under a pressure of 125 pounds per square inch gauge with a top temperature of —58° F. and a bottom temperature of —31° F. Fractionator 45 has a two-foot I. D. and is 85 feet high. The fractionator is packed with 69 feet of Raschig rings (217 cubic feet). 226 mols per hour of liquid kettle product is expanded and passed through overhead condenser 59 to partially condense the overhead vapors. 74 mols per hour of kettle product is expanded and passed through indirect heat-exchanger 51 to cool the feed making a total of 300 mols per hour of kettle product used in the internal-refrigeration cycle. The combined, expanded, ethane kettle product, refrigeration stream is compressed and cooled in the refrigeration system to a temperature of —31° F. and a pressure of 125 pounds per square inch gauge. The compressed and cooled vapor stream is then passed back into the kettle portion of fractionator 45 where the stream directly contacts the kettle product and furnishes stripping section vapors in fractionator 45. Overhead ethylene make product gas is withdrawn from overhead condenser 59 at a rate of 3318 mols/S. D. and passes through heat-exchanger 43 wherein it is heated to 92° F. in cooling the feed. This ethylene make stream has the following composition:

*Ethylene make product stream*

| | Mols/S. D. |
|---|---|
| Methane | 5 |
| Ethylene | 3019 |
| Ethane | 294 |
| Total | 3318 |

The ethane make product stream is withdrawn from the kettle of fractionator 45 at a rate of 363 mols/S. D. and passes through heat-exchangers 49 and 39 to cool the feed to fractionator 45. The ethane make product stream leaves heat-exchanger 39 at a tempreature of 92° F. and has the following composition:

*Ethane make product stream*

| | Mols/S. D. |
|---|---|
| Ethylene | 8 |
| Ethane | 345 |
| Propylene | 5 |
| Propane | 5 |
| Total | 363 |

As will be evident to those skilled in the art, various modifications of this invention can be made, or followed, in the light of the foregoing disclosure and discussion, without departing from the spirit or scope of the disclosure or from the scope of the claims.

I claim:

1. An internal-refrigerant low-temperature fractional distillation process for separating a multi-component mixture of vaporizable material into a low-boiling fraction and a high-boiling fraction which comprises, passing said mixture into a fractionation zone, withdrawing a liquid stream of kettle product from said fractionation zone, passing at least a portion of said stream through an expansion zone and therein vaporizing at least a portion of and cooling same, passing said expanded material in indirect heat-exchange relationship with overhead vapors of said fractionation zone to condense at least a portion of said overhead vapors, utilizing resulting condensed liquid as refluxing liquid in said fractionation zone, withdrawing a further portion of said overhead vapors as said low-boiling fraction of said multi-component mixture, withdrawing a further portion of kettle product from said fractionation zone, passing said withdrawn liquid stream through an expansion zone and vaporizing at least a portion of and cooling the same and passing resulting expanded and cooled material in indirect heat-exchange relationship with said mixture passed into said fractionation zone, compressing and partially cooling said expanded material, subsequently passing said compressed material into direct heat-exchange relationship with the kettle product of said fractionation zone to transfer heat from said material to said kettle product, and withdrawing at least a portion of said kettle product as said high-boiling fraction of said multi-component mixture.

2. An internal-refrigerant low-temperature fractional distillation process for separating a multi-component mixture of vaporizable material into a low-boiling fraction and a high-boiling fraction which comprises, passing said mixture into a fractionation zone, withdrawing a liquid stream of kettle product from said fractionation zone, passing at least a portion of said stream through an expansion zone and therein vaporizing at least a portion of and cooling same, passing said expanded material in indirect heat-exchange relationship with overhead vapors of said fractionation zone to condense at least a portion of said overhead vapors, utilizing resulting condensed liquid as refluxing liquid in said fractionation zone, withdrawing a further portion of said overhead vapors as said low-boiling fraction of said multi-component mixture, withdrawing a further portion of kettle product from said fractionation zone, passing said withdrawn liquid stream through an expansion zone and vaporizing at least a portion of and cooling the same and passing resulting expanded and cooled material in indirect heat-exchange relationship with said mixture passed into said fractionation zone, compressing and partially cooling said expanded material, subsequently passing said compressed material into direct heat-exchange relationship with the kettle product of said fractionation zone to transfer heat from said material to said kettle product, withdrawing at least a portion of said kettle product as said high-boiling fraction of said multi-component mixture, and passing said high and low-boiling fractions in indirect heat-exchange relationship with said original vaporizable material.

3. An internal-refrigerant low-temperature fractional distillation process for separating a multi-component mixture of vaporizable material into a low-boiling fraction and a high-boiling fraction which comprises, passing said mixture into a fractionation zone, withdrawing a liquid stream of kettle product from said fractionation zone, passing at least a portion of said stream through an expansion zone and therein vaporizing at least a portion of and cooling same, subsequently passing said expanded material in indirect heat-exchange relationship with overhead vapors of said fractionation zone to condense at least a portion of said overhead vapors, utilizing resulting condensed liquid as refluxing liquid in said fractionation zone, withdrawing a further portion of said overhead vapors as said low-boiling fraction of said multi-component mixture, withdrawing a further portion of kettle product from said fractionation zone, passing said withdrawn liquid stream through an expansion zone and vaporizing at least a portion of and cooling the same and passing resulting expanded and cooled material in indirect heat-exchange relationship with said mixture passed into said fractionation zone, compressing and partially cooling said expanded material, removing impurities, liquids, and polymers from said portion of the expanded material, subsequently passing said compressed material into direct heat-exchange relationship with the kettle product of said fractionation zone to transfer heat from said material to said kettle product, and withdrawing at least a portion of said kettle product as said high-boiling fraction of said multi-component mixture.

4. A low-temperature fractional distillation process for separating a multi-component mixture of low-boiling normally gaseous materials into a low-boiling fraction and a high-boiling fraction which comprises, passing said mixture into a fractionation zone, withdrawing a liquid stream of kettle product from said fractionation zone, passing said withdrawn liquid stream through an expansion zone and vaporizing at least a portion of and cooling same, subsequently passing resulting expanded material in indirect heat-exchange relationship with overhead vapors of said fractionation zone to condense at least a portion of said overhead vapors, utilizing resulting condensed liquid as reflux in said fractionation zone, withdrawing a further portion of said overhead vapors as said low-boiling fraction of said multi-component mixture, withdrawing a further portion of kettle product from said fractionation zone, passing said withdrawn liquid stream through an expansion zone and vaporizing at least a portion of and cooling the same and passing resulting expanded and cooled material in indirect heat-exchange relationship with said mixture passed into said fractionation zone, compressing and cooling at least a portion of said expanded material to a pressure and temperature at which partial condensation is imminent, passing said compressed material back into the kettle portion of said fractionation zone to reboil said fractionation zone by transferring heat directly from said material to said kettle product by condensing at least a portion of said compressed material, and withdrawing a portion of kettle product from said fractionation zone as said high-boiling fraction of said multi-component first mixture.

5. A low-temperature fractional distillation process for separating a mixture of ethane and ethylene, containing at least 20 per cent ethylene, into a low-boiling fraction and a high-boiling fraction containing no more than 12 mol per cent ethylene which comprises, passing said mixture into a fractionation zone operating under a pressure of from 50 to 250 pounds per square inch absolute and under a liquid reflux to overhead product ratio of from 5:1 to 11:1, withdrawing a liquid stream of kettle product from said fractionation zone, passing said withdrawn liquid stream through an expansion zone and vaporizing at least a portion of and cooling same, passing resulting expanded material in indirect heat-exchange relationship with overhead vapors of said fractionation zone to condense at least a portion of said overhead vapors, utilizing resulting condensed liquid as reflux in said fractionation zone, withdrawing a further portion of said overhead vapors as said low-boiling fraction of said first-named mixture, withdrawing a further portion of kettle product from said fractionation zone, passing said withdrawn liquid stream through an expansion zone and vaporizing at least a portion of and cooling the same and passing resulting expanded and cooled material in indirect heat-exchange relationship with said mixture passed into said fractionation zone, compressing and cooling at least a portion of said expanded material to a pressure and temperature at which partial condensation is imminent, passing said compressed material back into the kettle portion of said fractionation zone to reboil said fractionation zone by transferring heat directly from said material to said kettle product by condensing at least a portion of said compressed material, and withdrawing a portion of kettle product from said fractionation zone as said high-boiling fraction of said first mixture.

6. A low-temperature fractional distillation process for separating a mixture of ethane and ethylene, containing at least 20 mol per cent ethylene, into a low-boiling fraction and a high-boiling fraction containing no more than 12 mol per cent ethylene which comprises: passing said mixture into a fractionation zone operating under a pressure of from 50 to 250 pounds per square inch absolute and under a liquid reflux to overhead product ratio of from 5:1 to 11:1; withdrawing a portion of kettle product from said fractionation zone as said high-boiling fraction of said mixture, passing same through an expansion zone to vaporize at least a portion of and cool same and passing a resulting cooled stream in indirect heat-exchange relationship with said mixture passed into said fractionation zone; withdrawing a further portion of kettle product from said fractionation zone, passing said withdrawn stream through an expansion zone and vaporizing at least a portion of and cooling same and passing resulting expanded and cooled material in indirect heat-exchange relationship with overhead vapors of said fractionation zone to condense at least a portion of said overhead vapors; utilizing resulting condensed liquid as reflux in said fractionation zone; withdrawing a further portion of kettle product from said fractionation zone, passing said withdrawn liquid stream through an expansion zone and vaporizing at least a portion of and cooling same and passing resulting expanded and cooled material in indirect heat-exchange relationship with said mixture passed into said fractionation zone; combining said expanded material passed in indirect heat-exchange relationship with overhead vapors of said fractionation zone with said last-named expanded material passed in indirect heat-exchange with said mixture passed into said fractionation zone; compressing and cooling at least a portion of a resulting combined stream to a pressure and temperature at which partial condensation is imminent; passing said compressed material back into the kettle portion of said fractionation zone to reboil said fractionation zone by transferring heat directly from said material to said kettle product by condensing at least a portion of said compressed material; and withdrawing a further portion of said overhead vapors as said low-boiling fraction of said first mixture and passing same in indirect heat-exchange relationship with said first mixture passed into said fractionation zone.

7. Internal refrigerant low-temperature distillation apparatus for separating a multiple component mixture of vaporizable material into a low-boiling fraction and a high-boiling fraction comprising, a fractionator, feed means extending into the central portion of said fractionator, a first indirect heat-exchanger, a conduit communicating with and extending from the lower portion of said fractionator through said heat exchanger and connected to the kettle portion of said fractionator, an expansion valve in said conduit located upstream of said heat exchanger, a compressor in said conduit located downstream of said first heat exchanger, a cooler located downstream of said compressor, a product removal conduit extending from the said kettle portion of said fractionator, a bypass conduit extending from said kettle product removal conduit to a point between said first heat-exchanger and the compressor, an expansion valve located in said bypass conduit, and a second indirect heat-exchanger located downstream of said expansion valve, said feed means passing through said second heat-exchanger, an overhead removal conduit extending from the upper portion of the fractionator to said first heat-exchanger, a reflux return conduit extending from said first heat exchanger and into the upper portion of said fractionator, and a product removal conduit extending from said heat-exchanger.

8. The apparatus of claim 7 in which a first liquid separator is located between said first heat exchanger and said compressor and a second liquid separator is located downstream of said cooler.

9. The apparatus of claim 7 in which there is provided an auxiliary feed conduit communicating with said fractionator, a compressor in said conduit, and a cooler in said conduit downstream of said compressor.

10. The method of separating a mixture of light normally gaseous hydrocarbons into a light fraction and a heavy fraction which comprises passing said mixture to a fractionation operation, producing therein a gaseous overhead and a liquid bottoms, expanding a first portion of said liquid bottoms to a temperature below that of said mixture, passing said cooled expanded first portion of bottoms in indirect heat exchange relationship with said mixture thereby cooling said mixture prior to its admission to said fractionation operation and simultaneously vaporizing said first portion of said bottoms liquid, expanding a second portion of said liquid bottoms to a temperature below that of said gaseous overhead, passing said cooled expanded second portion of bottoms in indirect heat exchange relationship with said gaseous overhead thereby condensing at least a part of said overhead and simultaneously vaporizing said second portion of bottoms liquid, combining said vaporized first portion and said vaporized second portion of bottoms to produce a combined vaporized bottoms, compressing said combined vaporized bottoms to a pressure and temperature greater than that in a lower point of said fractionation operation, passing said compressed vaporized bottoms to a lower point in said fractionation operation, thereby supplying heat thereto, removing a portion of said overhead as a light fraction, and removing a portion of said liquid bottoms as a heavier fraction.

11. The method of separating a mixture of light normally gaseous hydrocarbons into a light fraction and a heavy fraction which comprises passing said mixture to a fractionation operation, producing therein a gaseous overhead and a liquid bottoms, passing a first portion of said liquid bottoms in indirect heat exchange relationship with at least a part of said mixture thereby cooling same prior to its admission to said fractionating operation, expanding a second portion of said liquid bottoms to a temperature below that of said overhead, passing said cooled expanded second portion of bottoms in indirect heat exchange relationship with said gaseous overhead thereby condensing said overhead and simultaneously vaporizing said second portion of bottoms liquid, compressing said vaporized bottoms to a pressure and temperature greater than that in a lower point of said fractionation operation, passing said compressed vaporized bottoms to a lower point in said fractionation operation thereby supplying heat thereto, removing a portion of said liquid bottoms as a heavy fraction, and removing a portion of said overhead as a light fraction.

12. The method of separating a mixture of light normally gaseous hydrocarbons into an olefinic fraction and a paraffinic fraction which comprises passing said mixture to a fractionation operation, producing therein a gaseous olefin overhead and a liquid paraffin bottoms, expanding a portion of said liquid bottoms to a temperature below that of said gaseous overhead, passing said cooled expanded bottoms portion in indirect heat exchange relationship with said gaseous overhead thereby condensing at least a portion of said overhead and simultaneously vaporizing said bottoms liquid, compressing the vaporized bottoms to increase the pressure and temperature thereof, thereafter adjusting the temperature of said compressed bottoms by indirect heat exchange, discharging said temperature adjusted compressed bottoms to a lower part of said fractionation operation to supply controlled heat thereto and to strip lighter fractions from the feed to said fractionation operation, removing a portion of said overhead as an olefinic fraction and removing a portion of said liquid bottoms as a paraffinic fraction.

13. The method of separating a mixture of light normally gaseous hydrocarbon claimed in claim 12 wherein said mixture comprises propane and propylene.

References Cited in the file of this patent

UNITED STATES PATENTS

| | | |
|---|---|---|
| 1,073,843 | Blau | Sept. 23, 1913 |
| 2,095,809 | Gomonet | Oct. 12, 1937 |
| 2,127,004 | Nelson | Aug. 16, 1938 |
| 2,284,662 | Kahle | June 2, 1942 |
| 2,327,643 | Houghland | Aug. 24, 1943 |
| 2,482,304 | Van Nuys | Sept. 20, 1949 |
| 2,577,701 | Deming et al. | Dec. 4, 1951 |
| 2,600,110 | Hachmuth | June 10, 1952 |
| 2,619,814 | Kniel | Dec. 2, 1952 |
| 2,620,637 | Schilling | Dec. 9, 1952 |
| 2,629,239 | Gantt | Feb. 24, 1953 |